March 21, 1950          J. V. RIEGER          2,501,581

HINGE JOINT

Filed May 6, 1946

INVENTOR.
Joseph V. Rieger
BY
Frease and Bishop
ATTORNEYS

Patented Mar. 21, 1950

2,501,581

UNITED STATES PATENT OFFICE 2,501,581

HINGE JOINT

Joseph V. Rieger, New Philadelphia, Ohio

Application May 6, 1946, Serial No. 667,581

5 Claims. (Cl. 16—143)

The invention relates generally to hinge joints and more particularly to a hinge joint which normally turns freely in all positions and is quickly and easily locked in any one of a plurality of adjusted positions.

There have been numerous prior hinge constructions which have embodied spring-pressed means for frictionally resisting turning of the hinge. However, such constructions do not positively lock the hinge members in any relative position, but instead they yieldingly resist the turning of the hinge members in all positions.

Other prior hinge joint constructions have been provided with locking means which are operative at only one relative position of the hinge members, and such locking means have been complicated or expensive, or both. Moreover, most of these prior constructions depend upon spring action in one way or another, so that they are not always positive and the parts are subject to wear or deterioration in use.

Accordingly, it is an object of the present invention to provide a novel hinge joint in which the hinge members normally turn freely in all positions.

Another object is to provide a novel hinge joint which is quickly and positively locked in any one of a number of positions, and just as quickly unlocked to permit free turning.

A further object is to provide a novel hinge joint which provides for positive locking of the hinge members in a desired position or positions, without requiring springs or other parts that are subject to appreciable wear.

Another object is to provide a novel hinge joint having external visual means for indicating the locked or unlocked position of the hinge members.

Finally, it is an object of the present invention to provide a simple and inexpensive hinge joint which overcomes the disadvantages of prior constructions, and which is readily adapted for many uses.

These and other objects are accomplished by the parts, elements, constructions, and combinations which comprise the present invention, the nature of which is set forth in the following general statement, a preferred embodiment of which is set forth in the following description and illustrated in the accompanying drawing, and which is particularly and distinctly pointed out and set forth in the appended claims forming part hereof.

In general terms, the invention may be stated as including one hinge member having an annular joint portion thereon, another hinge member having a projecting portion journaled in said annular portion and having one or more spherical recesses in the side thereof for selectively receiving a ball movably mounted in a recess in the annular portion, there being a locking ring surrounding the annular portion for frictionally engaging the ball to lock it in one of said recesses, and having one or more internal grooves for receiving the ball to allow the projecting joint portion of said other member to swivel freely in said annular portion.

Referring to the drawing in which a preferred embodiment of the improved hinge joint is shown by way of example;

Similar numerals refer to similar parts throughout the several views of the drawing.

Figure 1:
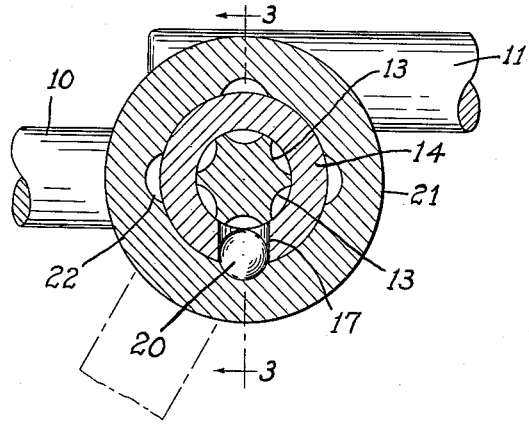
Figure 1 is a plan sectional view of the improved joint in unlocked or freely swingable position.

As shown in the drawing, the two swingable arm members which are connected by the novel hinge joint are represented by the bars or rods 10 and 11 respectively, and these members may be connected, for example, to the folding parts of a bed or stretcher, or to a folding awning and its support, or to a swinging gate or door and its frame. Obviously, the members 10 and 11 may be connected to or comprise hingedly connected parts used in a variety of other constructions.

Figure 2:
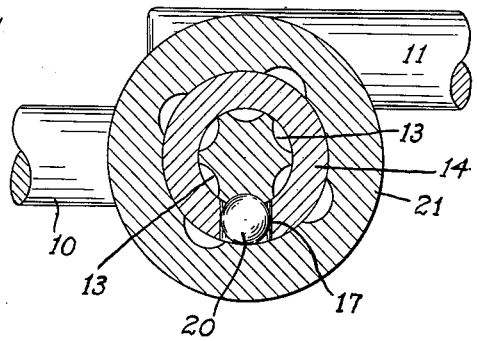
Fig. 2 is a similar view of the improved joint in locked position.
Figure 3:
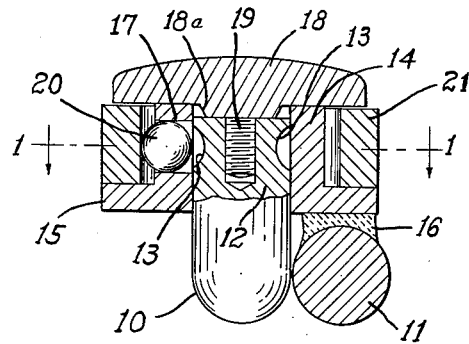
Fig. 3 is a transverse sectional view as on line 3—3, in Fig. 1.
Figure 6:
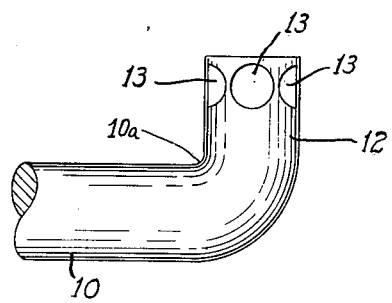
Fig. 6 is a detached fragmentary view of the swivel portion of the hinge member, which occupies a position axially of the joint.

As best shown in Fig. 6, the joint end of the rod 10 is preferably provided with an angular swivel portion 12 which, as shown in Fig. 3, is located axially of the novel hinge joint. The swivel is provided near its outer end with circumferentially arranged spherical recesses or indentations 13 extending laterally into the swivel. The recesses 13 may be six in number as shown, although the number of recesses may be varied as desired. The other rod 11 comprising the other hinge member preferably has attached to its outer end an annular joint portion or sleeve 14 in which the swivel 12 is axially journalled, and the sleeve 14 preferably has an annular flange portion 15 to which the rod 11 is secured, as by welding indicated at 16. Preferably, the rod 11 is offset with respect to the sleeve 14, that is, is secured to one side of the flange 15, so that the ends of the rods 10 and 11 can overlap when the joint is in the position shown in Figs. 1 to 4.

Figure 4:
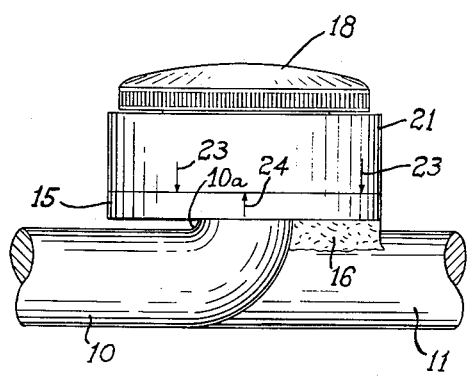
Fig. 4 is a side elevation of the joint in the position of Fig. 2.
Figure 5:
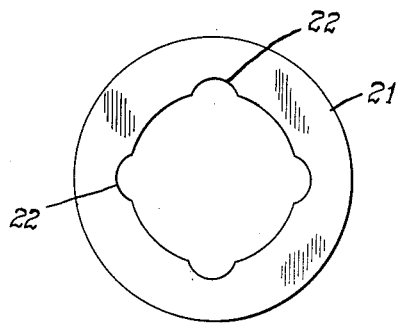
Fig. 5 is a detached plan view of the locking ring.

The sleeve 14 is provided with an aperture 17 extending laterally through one side thereof, and the aperture 17 is adapted to register with any one of the recesses 13 when the joint is assembled. As best shown in Figs. 3 and 4, the joint preferably is held in assembled position by means of a cap 18 which has a screw stud 19 screwed axially into the outer end of the swivel 12 with the underside of the cap 18 slidably abutting the upper end of the sleeve 14. The fillet or curve 10a between the bar 10 and the swivel portion 12 serves to limit downward movement of sleeve 14 on swivel 12.

As shown, a ball 20 is movably mounted in the aperture 17 for being received into any one of the recesses 13 of the swivel with which the aperture 17 is in register, and if the ball is held engaged in one of the recesses 13, it is obvious that the swivel 12 will be locked with respect to the sleeve 14. The means for holding the ball in locked engagement with any one of said recesses 13 preferably includes a locking ring 21 which encircles the sleeve 14 and is journaled thereon. As shown in Fig. 3, the locking ring 21 is supported on the annular flange 15 of the sleeve 14, and the cap 18 is provided with a shoulder 18a abutting the end of the swivel 12. The distance between the upper surface of flange 15 and the top of sleeve 14 is greater than the height of ring 21 so as to provide the working clearance between the outer rim of the cap and the locking ring 21.

Preferably, the locking ring 21 has at least one groove 22 extending axially of the ring for receiving the ball 20 when the joint is in the unlocked position of Figs. 1 and 3, and preferably four such grooves are provided 90° apart around the inner periphery of the ring. Instead of the grooves 22 spherical recesses could be provided on the inner periphery of the ring 21 for receiving the ball in the unlocked position of the joint, but I prefer the axial grooves 22 because they facilitate assembly of the joint.

As shown in Fig. 4, visual means are preferably provided on the exterior of the locking ring 21 and the annular flange 15 of the sleeve 14 for indicating the position of the ball relative to the grooves 22 of the ring. Such visual means preferably comprises an arrow 23 located on the exterior of the surface of the ring opposite each of the grooves 22, and an arrow 24 located on the exterior of the flange 15 opposite the ball 20. By means of this visual indicator, the operator can always tell at a glance how to turn the ring 21 for placing the joint in unlocked condition, because when the arrow 24 is aligned with one of the arrows 23, the ball will be received in the corresponding groove 22 to allow free swiveling of the joint.

As shown in the drawing, the rods 10 and 11 are in an extended position parallel to each other, and can be locked in that position by turning the ring 21, as indicated in Fig. 2. The six recesses 13 in the swivel 12 provide for five other relative positions of the hinge member 10 one of which is indicated in dot-dash lines of Fig. 1, and in any of these positions the joint may be locked by turning the ring 21 to force the ball into the registering recess 13 of the swivel.

Accordingly, the novel hinge joint provides selectively for free swinging movement in any position or positive locking in any one of a plurality of positions, without requiring springs or parts subject to substantial wear. Furthermore, the present improved joint is simple and inexpensively constructed and easily assembled or disassembled, while being adapted for a variety of uses.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction and operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. Hinge joint construction including a pair of relatively swingable arm members, one member having an angular swivel portion axially of the joint, said swivel portion having a plurality of circumferentially arranged spherical recesses therein, the other member having a sleeve angularly disposed thereto journaling the swivel portion, said sleeve having an aperture extending laterally through one side thereof for registering with any one of said recesses, a ball movable laterally in said aperture for engaging in any of said recesses to lock said swivel portion and said arm members selectively in different relative positions, and a locking ring journaled on the sleeve and having a plurality of circumferentially arranged axially extending internal grooves for selectively receiving said ball to unlock said swivel portion.

2. Hinge joint construction including a pair of relatively swingable arm members, one member having an angular swivel portion axially of the joint, said swivel portion having a plurality of circumferentially arranged spherical recesses therein, the other member having a sleeve angularly disposed thereto journaling the swivel portion, said sleeve having an aperture extending laterally through one side thereof for registering with any of said recesses, a ball movable laterally in said aperture for engaging in any of said recesses to lock said swivel portion and said arm members selectively in different relative positions, means secured in the end of said swivel portion and axially slidably abutting said sleeve for holding the swivel portion and sleeve in assembled position, and a locking ring journaled on the sleeve and having a plurality of circumferentially arranged axially extending internal grooves for selectively receiving said ball to unlock said swivel portion.

3. Hinge joint construction including a pair of relatively swingable arm members, one member having an angular swivel portion axially of the joint, said swivel portion having a plurality of circumferentially arranged spherical recesses therein, the other member having a sleeve journaling the swivel portion, said sleeve having an aperture extending laterally through one side thereof for registering with any of said recesses, a ball movable laterally in said aperture for engaging in any of said recesses to lock said swivel portion and said arm members selectively in different relative positions, a locking ring journaled externally on the sleeve and having a plurality of circumferentially arranged axially extending internal grooves for selectively receiving said ball to unlock said swivel portion, and index means on the exterior of said sleeve and locking ring for indicating the position of the ball relative to the recesses in the locking ring.

4. Hinge joint construction including a pair of relatively swingable arm members, one member having an angular swivel portion axially of the joint, said swivel portion having a spherical recess formed laterally therein, the other member having a sleeve angularly disposed thereto journaling the swivel portion, said sleeve having an aperture extending laterally through one side thereof for registering with said spherical recess, a ball movable laterally in said aperture for engaging in said recess to lock said swivel portion and said arm members in angular position relative to each other, and a locking ring journaled on the sleeve and having an internal axially extending groove for receiving said ball to unlock said swivel portion.

5. Hinge joint construction including a pair of relatively swingable arm members, one member having an angular swivel portion axially of the joint, said swivel portion having a plurality of circumferentially arranged spherical recesses therein, the other member having a sleeve angularly disposed thereto journaling the swivel portion, said sleeve having an aperture extending laterally through one side thereof for registering with any of said recesses, a ball movable laterally in said aperture for engaging in any of said recesses to lock said swivel portion and said arm members selectively in different relative positions, and a locking ring journaled on the sleeve and having an internal axially extending groove for receiving said ball to unlock said swivel portion.

JOSEPH V. RIEGER.

REFERENCES CITED

The following references are of record in the file of this patent:

UNITED STATES PATENTS

| Number | Name | Date |
|---|---|---|
| 1,045,891 | Robertson | Dec. 3, 1912 |
| 1,055,346 | McQuillan | Mar. 11, 1913 |
| 1,531,325 | White | Mar. 31, 1925 |

FOREIGN PATENTS

| Number | Country | Date |
|---|---|---|
| 583,491 | France | Oct. 31, 1924 |